United States Patent
DiSanto et al.

(10) Patent No.: US 7,120,796 B2
(45) Date of Patent: Oct. 10, 2006

(54) METHOD AND SYSTEM FOR PREVENTING COMPUTER WORM DISSEMINATION USING ENCRYPTION

(75) Inventors: Frank J. DiSanto, Manhasset, NY (US); Denis A. Krusos, Lloyd Harbor, NY (US); Edward Lewit, Roslyn Heights, NY (US)

(73) Assignee: Copytele, Inc., Melville, NY (US)

( * ) Notice: Subject to any disclaimer, the term of this patent is extended or adjusted under 35 U.S.C. 154(b) by 859 days.

(21) Appl. No.: 10/171,604

(22) Filed: Jun. 14, 2002

(65) Prior Publication Data

US 2003/0018904 A1    Jan. 23, 2003

Related U.S. Application Data

(60) Provisional application No. 60/298,737, filed on Jun. 14, 2001.

(51) Int. Cl.
*G06F 11/30* (2006.01)
(52) U.S. Cl. ........................ 713/168; 713/190
(58) Field of Classification Search ............... 713/168, 713/190, 200, 201
See application file for complete search history.

(56) References Cited

U.S. PATENT DOCUMENTS

| | | | |
|---|---|---|---|
| 4,200,770 A | 4/1980 | Hellman et al. | 178/22 |
| 6,275,934 B1* | 8/2001 | Novicov et al. | 713/168 |
| 6,289,318 B1* | 9/2001 | Barber | 705/14 |
| 6,496,931 B1* | 12/2002 | Rajchel et al. | 713/168 |
| 6,970,833 B1* | 11/2005 | Fuchs | 705/14 |

* cited by examiner

*Primary Examiner*—Thomas R. Peeso
(74) *Attorney, Agent, or Firm*—Plevy, Howard & Darcy, PC

(57) ABSTRACT

A method and system for preventing a computer worm from unauthorized use of data indicative of at least one e-mail address stored in a data base is presented. The method comprises the steps of encrypting said data, receiving at least one e-mail message by accessing an e-mail server, decrypting said selected ones of said data to provide access thereto, and addressing at least one e-mail message using said decrypted data. The method further includes the step of re-encrypting the selected decrypted data. In one aspect of the invention, the method of encrypting the data comprises the steps of obtaining a key value, selecting each of the at least one e-mail address, encrypting the selected e-mail address using the key value; and storing said encrypted e-mail in the data base.

38 Claims, 10 Drawing Sheets

| LAST NAME | : | SMITH |
|---|---|---|
| FIRST NAME | : | JOHN |
| ADDRESS | : | |
| CITY | : | |
| HOME TELE. | : | |
| WORK TELE. | : | |
| ⋮ | | |
| E-MAIL (HOME) | : | JSMITH@ISP1.COM |
| E-MAIL (WORK) | : | JASMITHJR@ISP2.COM |

METHOD AND SYSTEM FOR PREVENTING COMPUTER WORM DISSEMINATION USING ENCRYPTION

CLAIM OF PRIORITY FILING

This application is related to, and claims the benefit, pursuant to 35 U.S.C. §119, of the earlier filing date of U.S. Provisional Application Ser. No. 60/298,737, entitled "Method and System for Preventing Computer Worm Dissemination Using Encryption, having a filing date of Jun. 14, 2001.

FIELD OF THE INVENTION

The present invention relates to computer viruses and worms and more particularly to a method and system for preventing their self-dissemination.

BACKGROUND OF THE INVENTION

It has been known for some time that computer viruses and worms represent a significant threat to computer systems. A computer virus or worm can generally be identified as a program or set of computer instructions that is loaded onto and executed by a user's computer without the user's knowledge. A worm differs from a computer virus in that a computer virus typically attaches itself to another computer program or data file, i.e. an infected or target file, and is spread by a user's interaction with the target file, albeit unknowingly. In contrast, a worm self propagates without any user intervention. Computer viruses and worms often undesirably reduce otherwise available system resources such as memory and disrupt data stored on infected computer systems often resulting in system failure.

Recently, a new type of worm has seen increased commonality. This type of worm spreads, or replicates itself, from an infected system by automatically sending a copy of itself via e-mail to addresses identified in an address book. Examples of these types of worms include the widely disseminated "MELISSA" and "ILOVEYOU" worms. Of course, e-mail refers to the transmission of messages over communications networks, such as the global interconnection of computers and computer networks commonly referred to as the Internet. An address file, address book, or data base, acts as an electronic phone book which stores names, personal information and e-mail addresses of other users or computer systems for intended email recipients or frequently contacted e-mail addresses.

Hence, there is a need for a method and system for preventing computer worms from accessing the address book of a recipients and disseminating itself using the information or e-mail addresses contained therein.

BRIEF DESCRIPTION OF THE FIGURES

Various objects, features and advantages of the invention will become more apparent by reading the following detailed description in conjunction with the drawings, which are shown by way of example only, wherein.

DETAILED DESCRIPTION OF THE INVENTION

Figure 1:
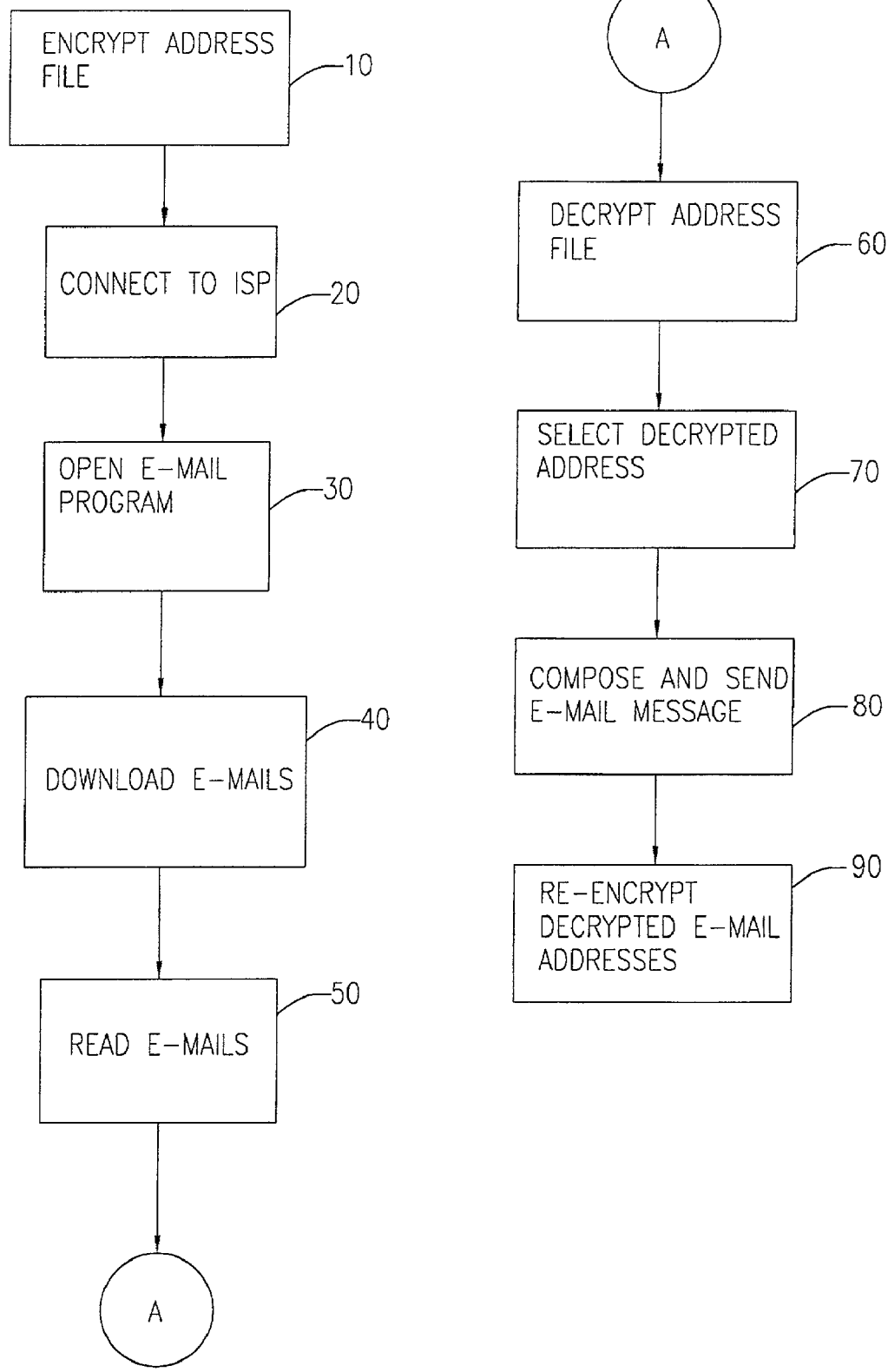
FIG. 1 illustrates a flow chart of an exemplary process in accordance with a first aspect of the present invention.

FIG. 1 illustrates a flow chart of a first exemplary process 100 in accordance with the principles of the invention. In this illustrated process, an e-mail address file or data base or address book is stored in an encrypted form at block 10. A user may communicate with an Internet Service Provider (ISP) 20 to connect to a network, such as the INTERNET, INTRANET, WAN, LAN, for example, and activates, or opens, a suitable e-mail software application program at block 30, such as OUTLOOK which is commercially available from MICROSOFT Corporation. Other commercial available software programs, such as Lotus NOTES, EUDORA, ACT, etc., are also suitable e-mail software programs that are also applicable to the present invention.

The selected e-mail software application then accesses an e-mail server (not shown) and downloads e-mails which were addressed to the user's e-mail account at block 40. The user then may open the received e-mails and read them at block 50.

Figure 2:
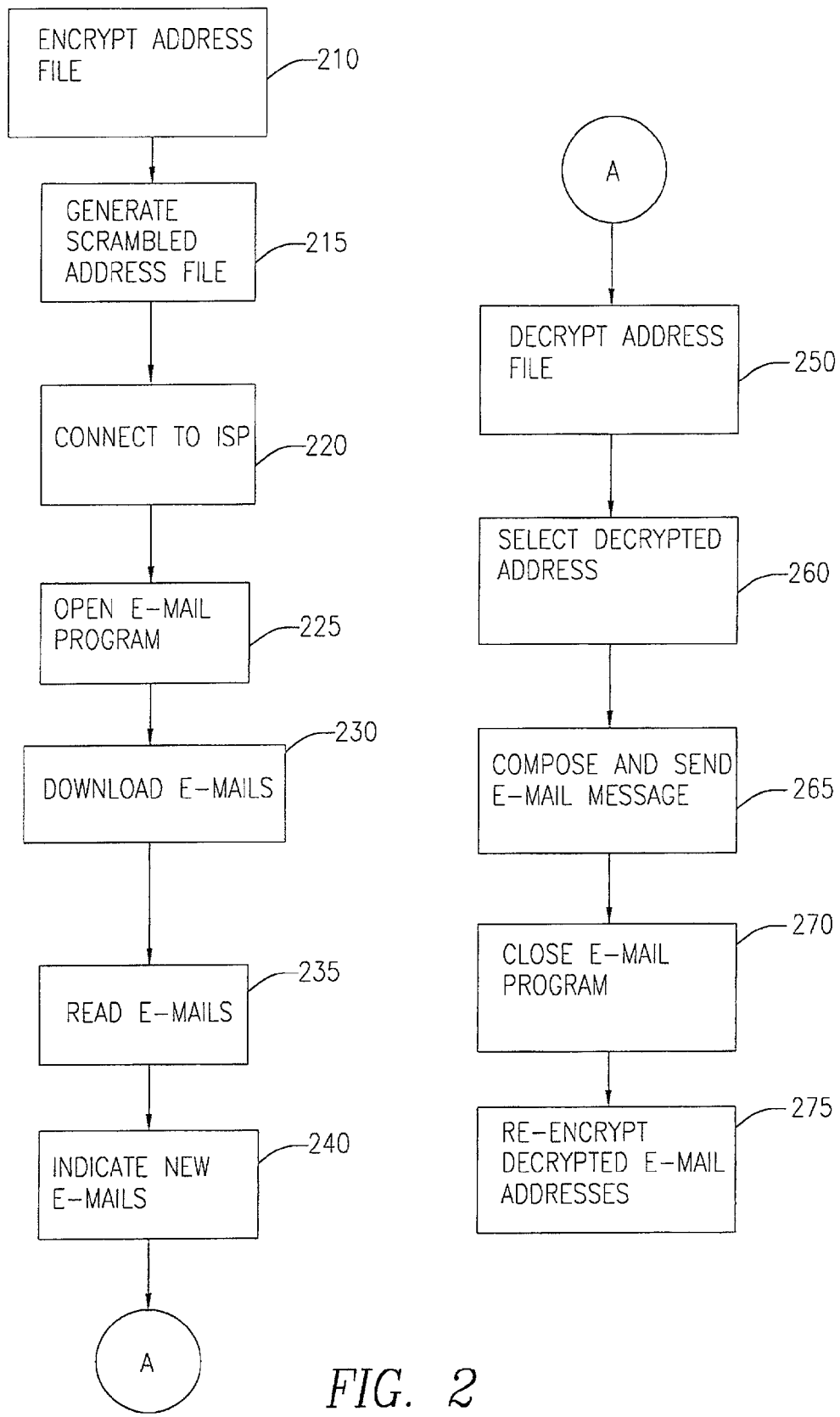
FIG. 2 illustrates a flow chart of an exemplary process in accordance with a second aspect of the invention.

The user may then forward the e-mail message and require access to e-mail addresses stored in a data base, address book, or address file that may be locally or remotely located. In this case, some or all addresses in the address file may be selected and decrypted at block 60. The decrypted address is stored in the address portion of at least one e-mail message at block 70. The user may then compose and send e-mail message(s) to the selected address(es) using conventional methodology at block 80. In another aspect of the invention, the decrypted email addresses may be stored in the e-mail address book and the e-mail program may extract the designated addresses. At block 90, the selected decrypted addresses are again encrypted FIG. 2 illustrates a flow chart of a second exemplary process 200 in accordance with a second aspect of the present invention. In this case, the address file is encrypted at block 210. An encrypted address file, or file which contains obscured address information, is accessed at block 215. A user may then communicate with an Internet Service Provider (ISP) at block 220 to connect to a network (not shown). At block 225, a suitable e-mail software application is opened. The e-mail software application then accesses an e-mail server and downloads e-mails that were addressed to the user's e-mail account at block 230. The user may then open the received e-mails and can read them at block 235. The user may then indicate that he wants to send an e-mail message to at least one intended recipient at block 240.

At block 250, the address file may be decrypted and made accessible to the user. The user may then select the address of at least one intended recipient at block 260 and compose and send one or more e-mail messages at block 265, as is conventionally understood. The e-mail application may then be closed at block 270, and the address file protected again 275 by re-encrypting the selected address(es) and storing the encrypted address(es) in the address book.

Figure 3:
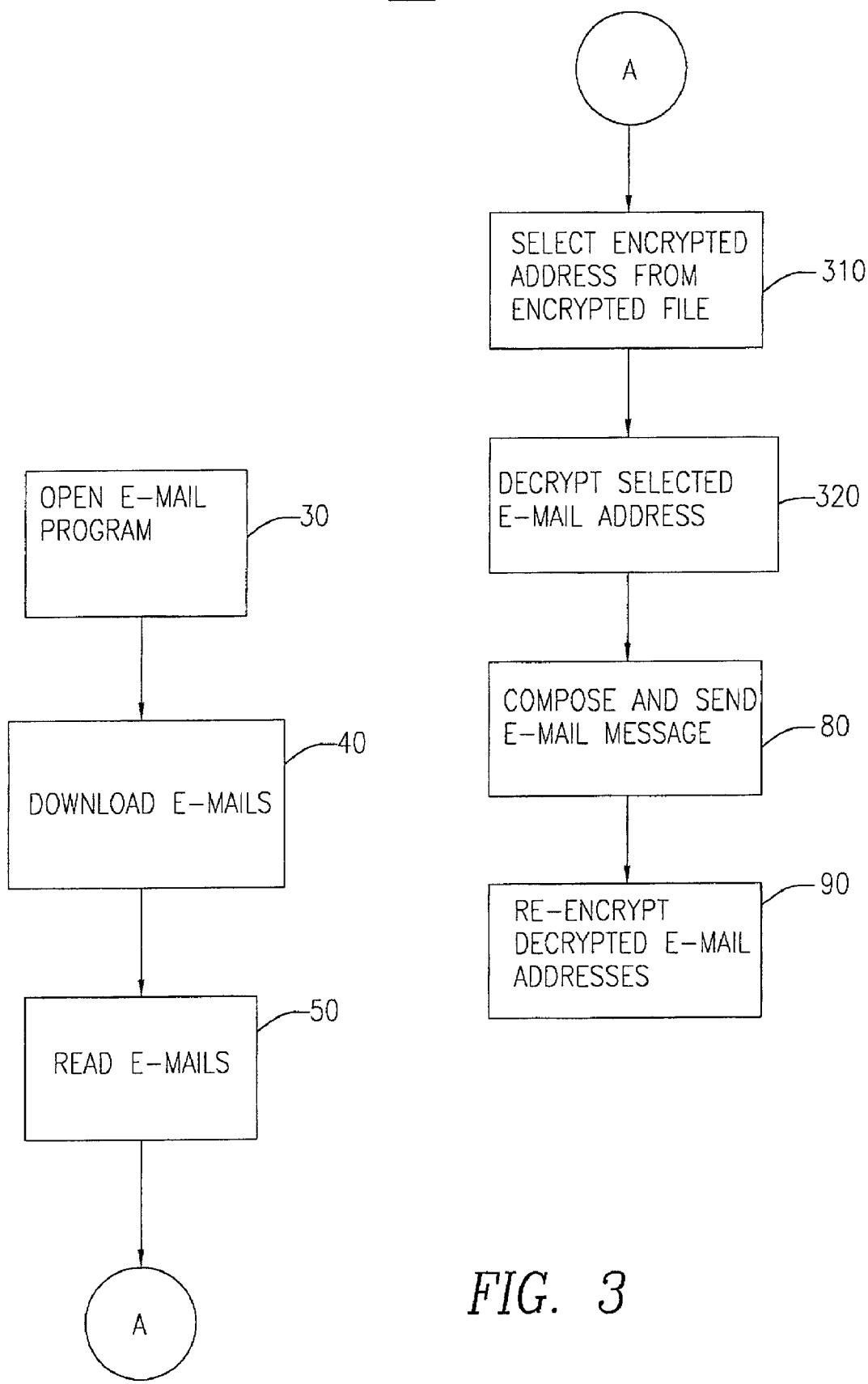
FIG. 3 illustrates a flow chart of an exemplary process in accordance with a third aspect of the invention.

FIG. 3 illustrates a flow chart of another exemplary process 300 depicting an operation of the present invention. In this exemplary process a program suitable for e-mail transmission is opened at block 30. At block 40, e-mails addressed to the user are downloaded. At block 50, the downloaded e-mail messages are read.

In response to one or more e-mail messages or a desire to create a new e-mail message or forward one or more received e-mail message, a user may select one or more encrypted e-mail addresses from a data base of e-mail addresses at block 310. At block 320, the selected encrypted e-mail addresses are decrypted using known decryption methods. At block 80, an e-mail message is composed and sent via a network connection to the designated e-mail addresses. At block 90 the selected addresses are again encrypted using known encryption methods.

Figure 4:
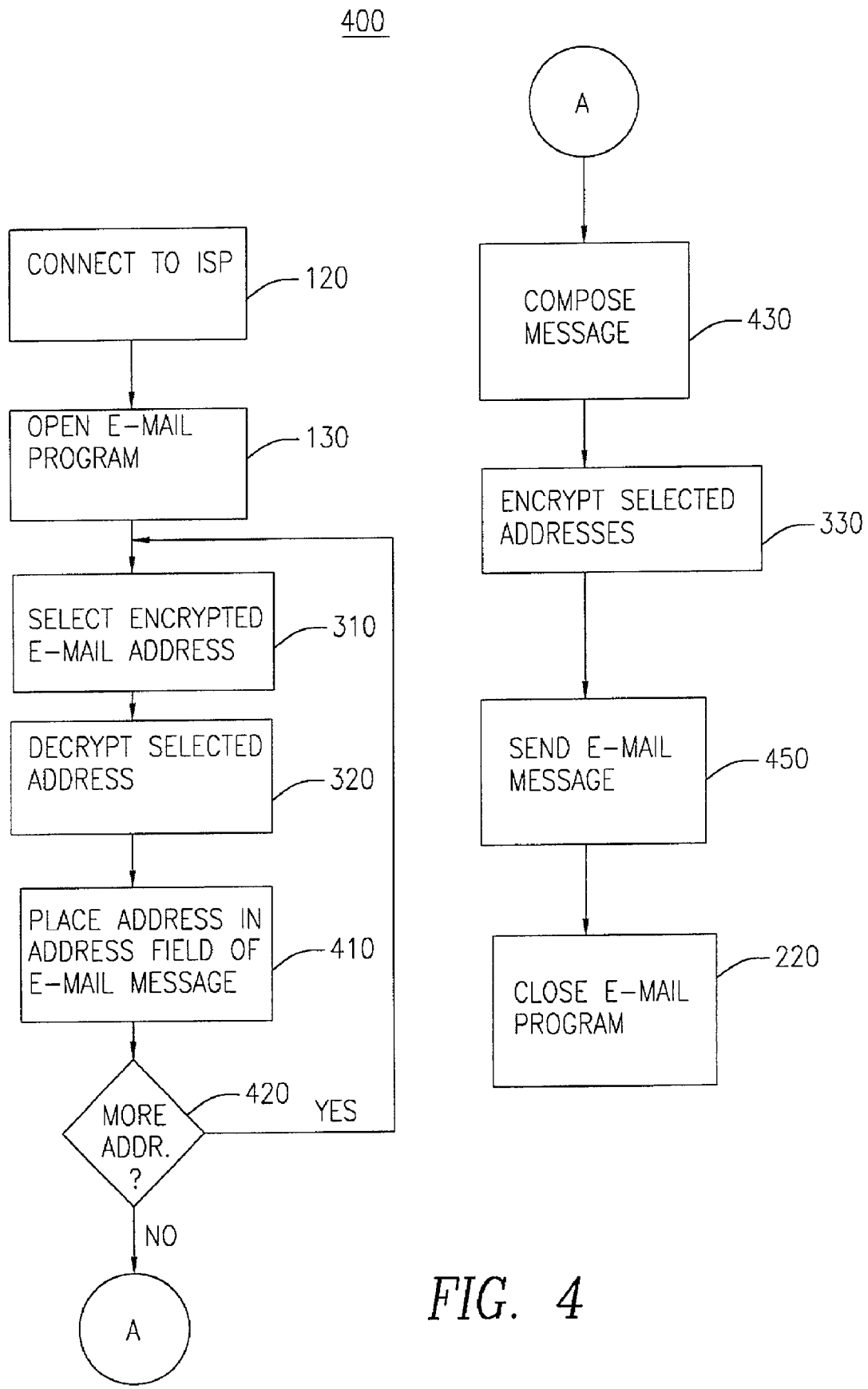
FIG. 4 illustrates a flow chart of an exemplary process in accordance with a fourth aspect of the invention.

FIG. 4 illustrates a flow chart of still another exemplary process 400 depicting an operation of the present invention. In this exemplary process, a connection is made to an Internet Service Provider (ISP) at block 120. At block 130 a program suitable for e-mail transmission is opened at block 130. At block 310, an e-mail address is selected from a data base of e-mail addresses at block 310. At block 320, the selected encrypted e-mail addresses are decrypted using known decryption methods. At block 410, the decrypted selected e-mail address is placed in the header of the e-mail message. At block 420, a determination is made whether more addresses are desired. If the answer is in the affirmative, then process continues at block 310 to select a next encrypted address.

If however, the answer is negative, then processing continues at block 310, where an e-mail message is composed. Upon completion of the e-mail message, the selected e-mail addresses are again encrypted at block 230. At block 450, the composed e-mail message is sent via a network connection through the selected ISP. At block 220, the e-mail program is closed and processing is completed at block 460.

Figures 5A, 5B:
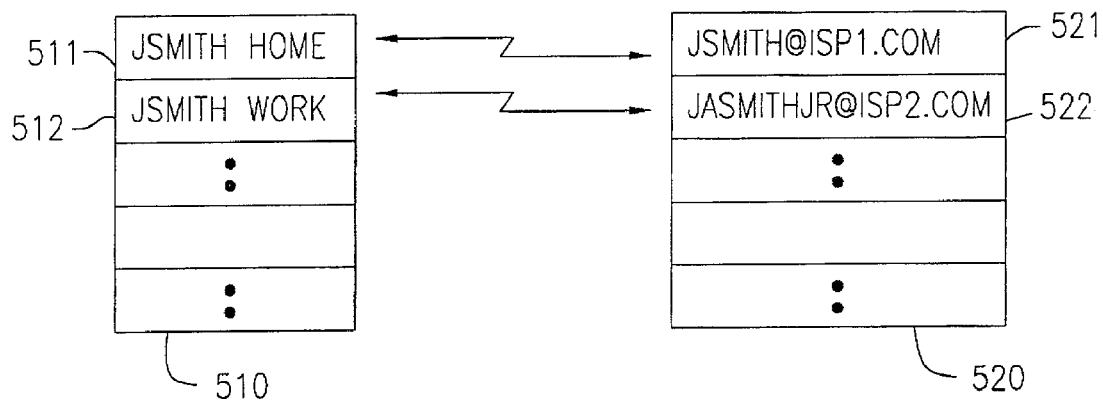
FIGS. 5a and 5b illustrate conventional data base structures.

FIG. 5a illustrates one example of a conventional data base structure using a first file or table 510 containing informational data regarding a particular entry, e.g., name and location, and a second file or table 510 containing a corresponding e-mail address. In this illustrated example, first table 510 and second table 520 are in a one-to-one relation and an entry, for example Jsmith Home 511 includes a pointer to an entry in second table 520 that contains an corresponding e-mail address "Jsmith@ISP1com."

FIG. 5b illustrates a second example of a conventional data base structure using packets to contain informational items and corresponding e-mail addresses. In this illustrated example, e-mail addresses of the designated entity are included in known positions or locations within a packet. Hence, corresponding e-mail address information may be accessed using an index into each packet. As will be appreciated, data base configurations for conventional e-mail programs are known in the art and the use different configurations or structures are contemplated to be within the scope of the invention.

Figure 6:
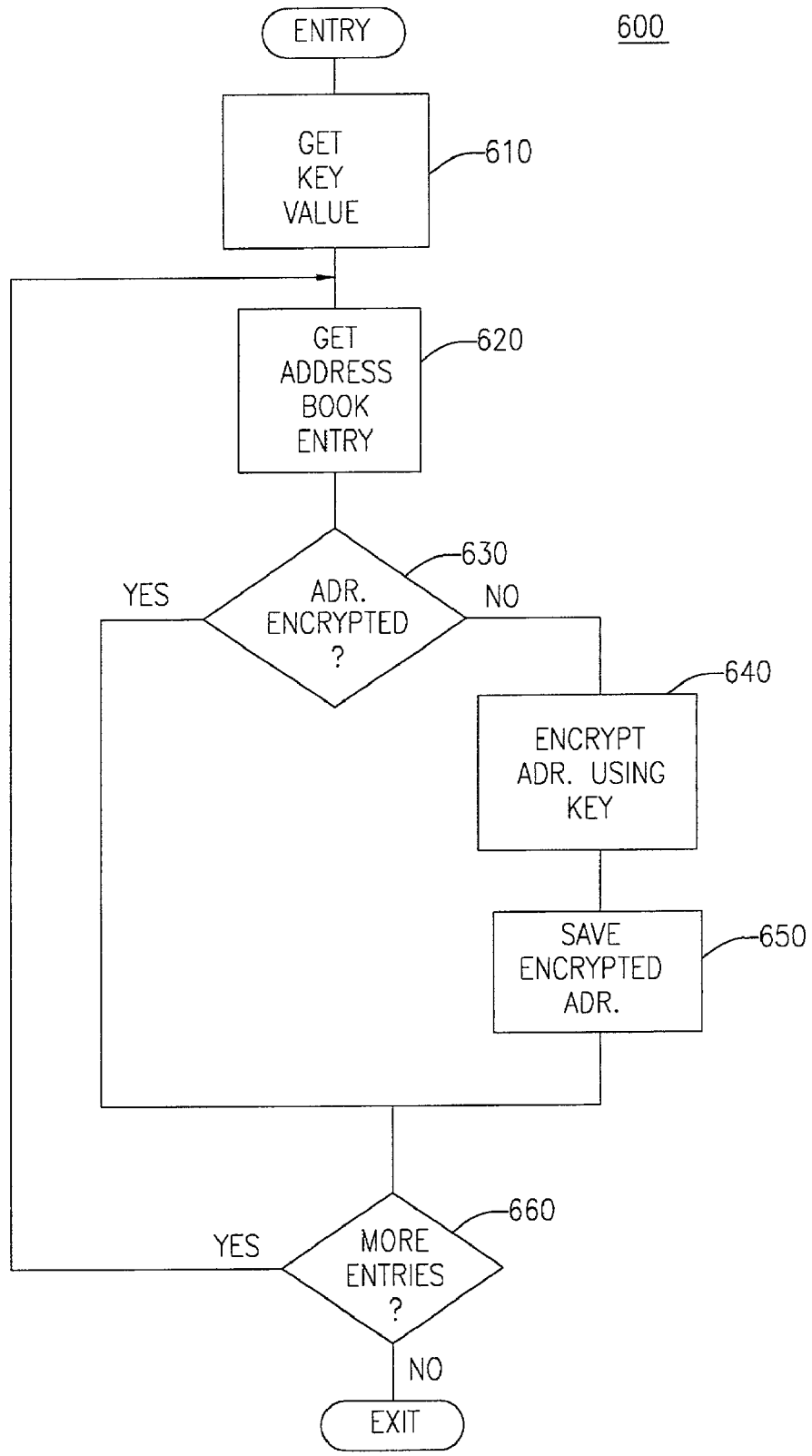
FIG. 6 illustrates a flow chart of an exemplary process for encrypting e-mail addresses in accordance with the principles of the invention.

FIG. 6 illustrates a flow chart depicting an exemplary process 600 for encrypting e-mail addresses in accordance with the present invention. In this process, a key value is obtained at block 610. At block 620, an e-mail address entry is obtained from the data base, or address book, at block 630, a determination is made whether the obtained e-mail address is encrypted. If the answer is in the affirmative, then processing continues at block 660.

If, however, the answer is negative, then the address is encrypted using the obtained key value and known encryption methods. At block 650, the encrypted e-mail address is saved in the address book.

At block 660, a determination is made whether more entries are available in the address book. If the answer is in the affirmative then processing continues at block 620 where a next/subsequent e-mail address is selected. Although not shown it will be understood, that each e-mail address of a data base or address book using a packet structure would be encrypted before a next entry is selected from the data base or address book.

Figure 7:
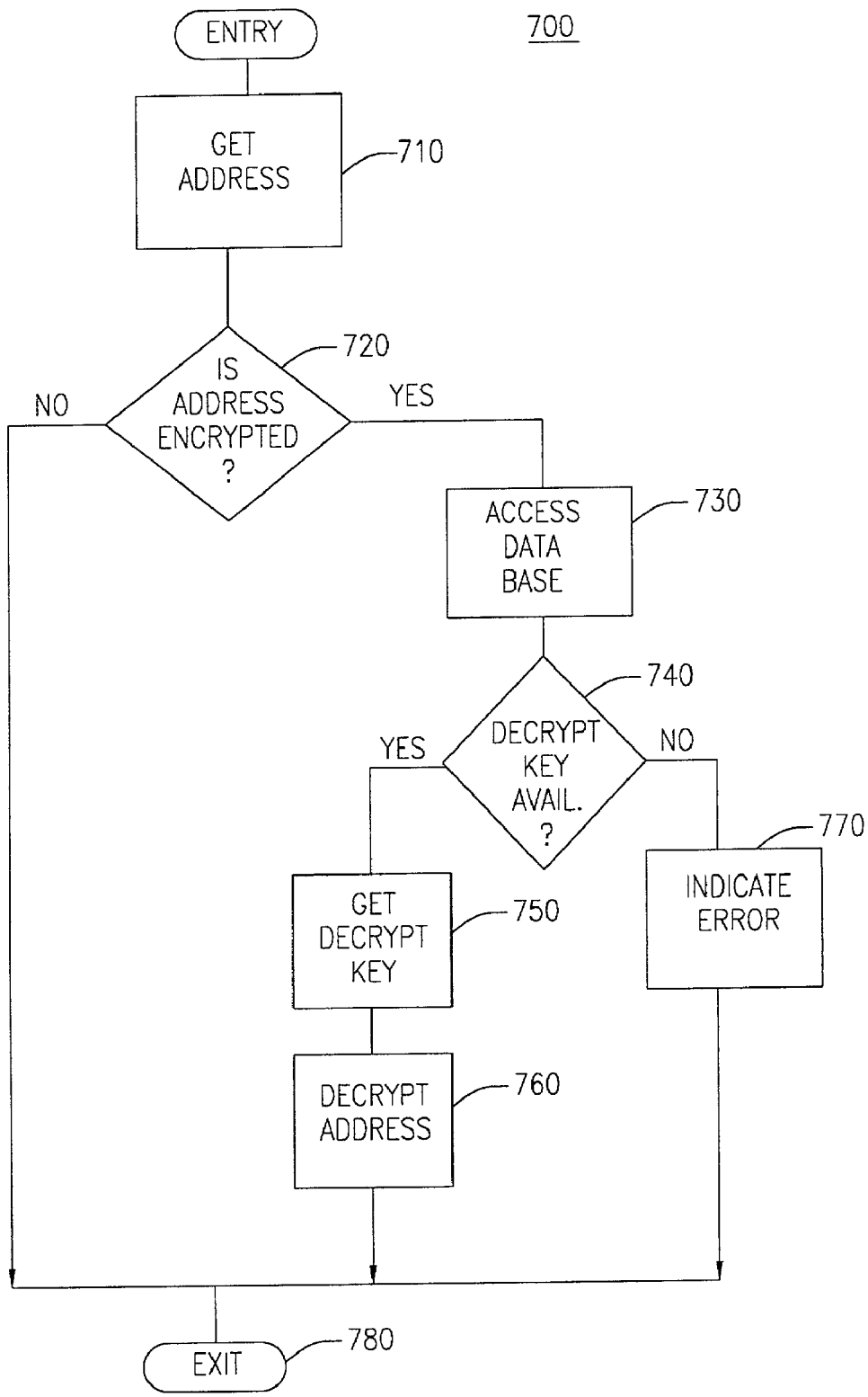
FIG. 7 illustrates a flow chart of an exemplary process for decrypting e-mail addresses in accordance with the principles of the invention.

FIG. 7 illustrates a flow chart depicting an exemplary process 700 for decrypting e-mail addresses in accordance with the principles of the present invention. In this illustrative process, an e-mail address is obtained at block 710. At block 720, a determination is made whether the obtained e-mail address is encrypted. If the answer in negative then process exits at block 780.

If however, the answer is in the affirmative, then the data base or address book are accessed at block 730 to obtain the corresponding encrypted e-mail address. At block 740 a determination is made whether a decryption key is available. If the answer is negative, then an error is indicated at block 770.

However, if the answer is in the affirmative, then a decryption key is obtained at block 750 and the encrypted e-mail address is decrypted at block 760 using known decryption methods.

At block 780, processing is ended with an e-mail address suitable for addressing a destination via a network.

Figure 8:
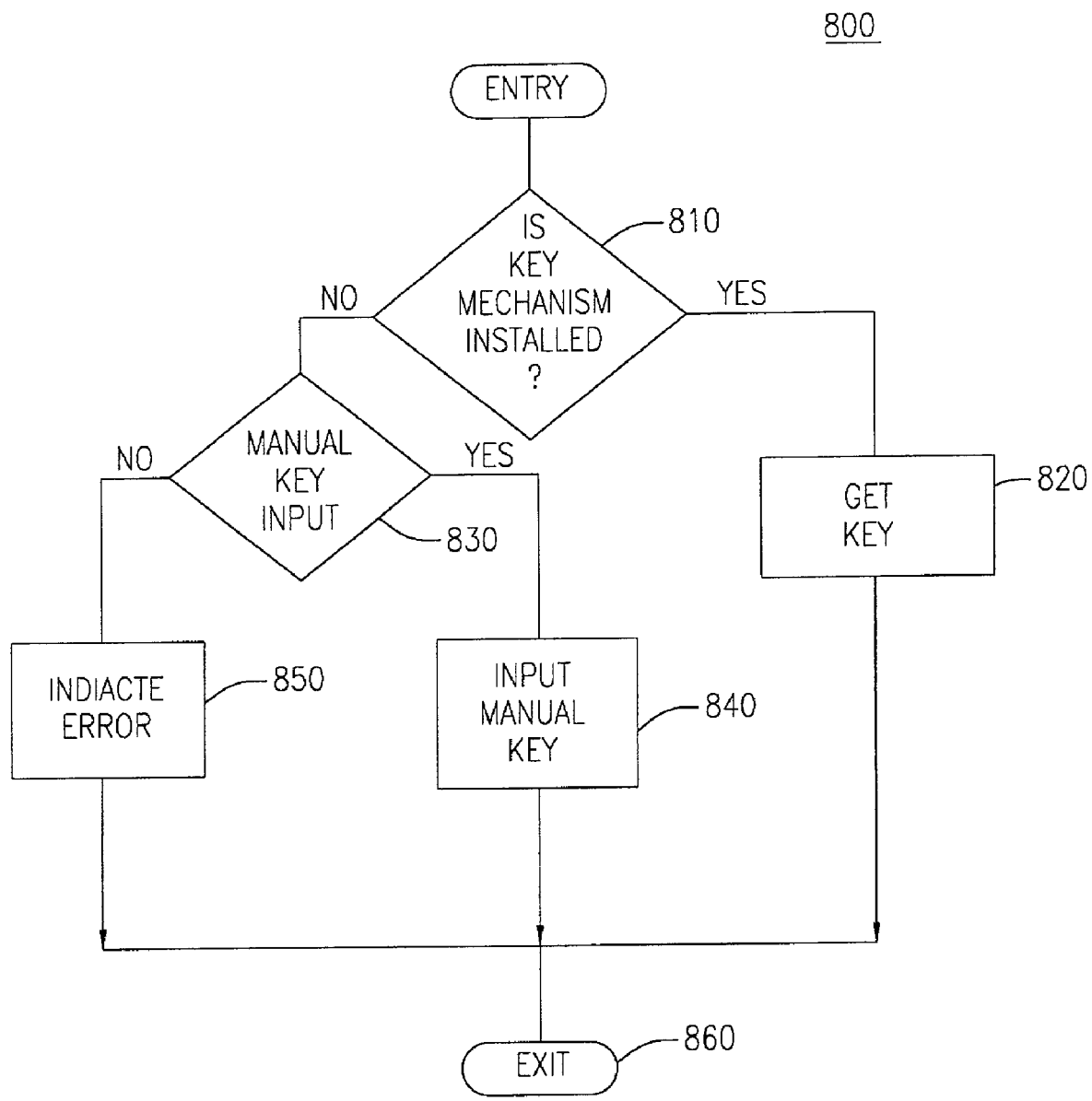
FIG. 8 illustrates a flow chart of an exemplary process for obtaining encryption keys.

FIG. 8 illustrates a flow chart of an exemplary process 800 for obtaining a key in accordance with one aspect of the invention. In this illustrated aspect, a determination is made, at block 810, whether a key mechanism is available or installed. If the answer is in the affirmative, then a key is obtained from the key mechanism at block 820.

However, if the answer is negative, then a determination is made, at block 830, whether a manual key input is available. If the answer is negative, then an error is indicated at block 850. If, the answer is in the affirmative, then a key may be manually inputted at block 840.

Processing is completed at block 860.

Figure 9:
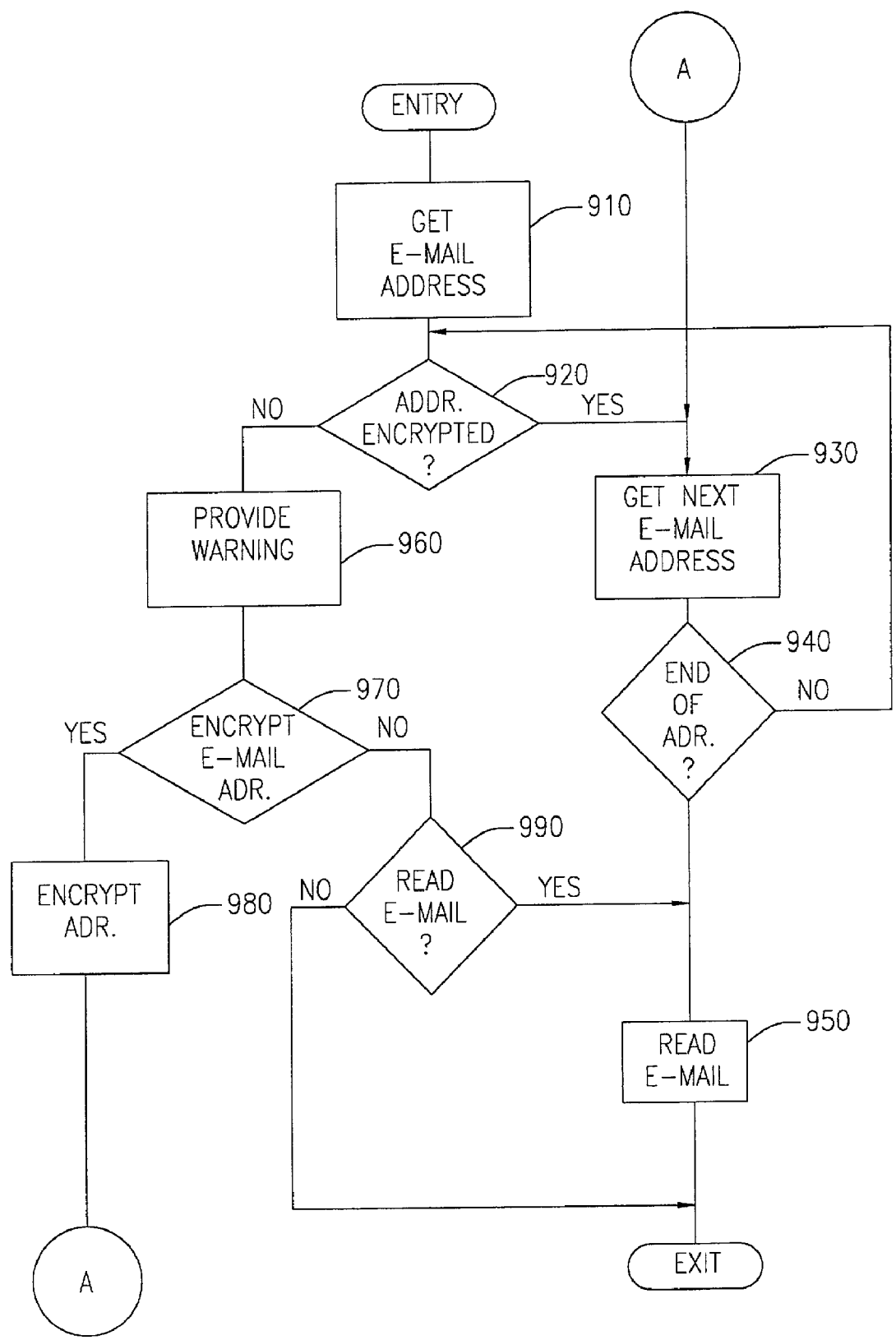
FIG. 9 illustrates a flow chart of a process for insuring address encryption before reading e-mail messages.

FIG. 9 illustrates a flow chart of an exemplary process 900 for insuring encrypted e-mail addresses before reading received e-mails. In this exemplary process, before emails are read, an e-mail address in the address book is selected or obtained at block 910. At block 920, a determination is made whether the selected address is encrypted. If the answer is in the affirmative, then a next e-mail address is obtained at block 930. At block 940, a determination is made whether end of the address book has been reached. If the answer is negative, then process returns to block 920 to determine whether the selected address is encrypted.

If, however, the answer is in the affirmative, then e-mails are read at block 950.

However, if the determination at block 920 is negative, then a warning may be provided at block 960. At block 970 a determination is made whether the selected address may be encrypted. If the answer is in the affirmative, then the selected address may be encrypted using known encryption methods.

If the answer is, however, negative, then a determination is made, at block 990, whether e-mail addresses may be read. If the answer is in the affirmative, then received e-mails may be read at block 950.

If, however, the answer is in the negative, then process is ended. In another aspect of the invention (not shown), processing may continue at block 930 to check each e-mail address in the address book.

Figure 10:
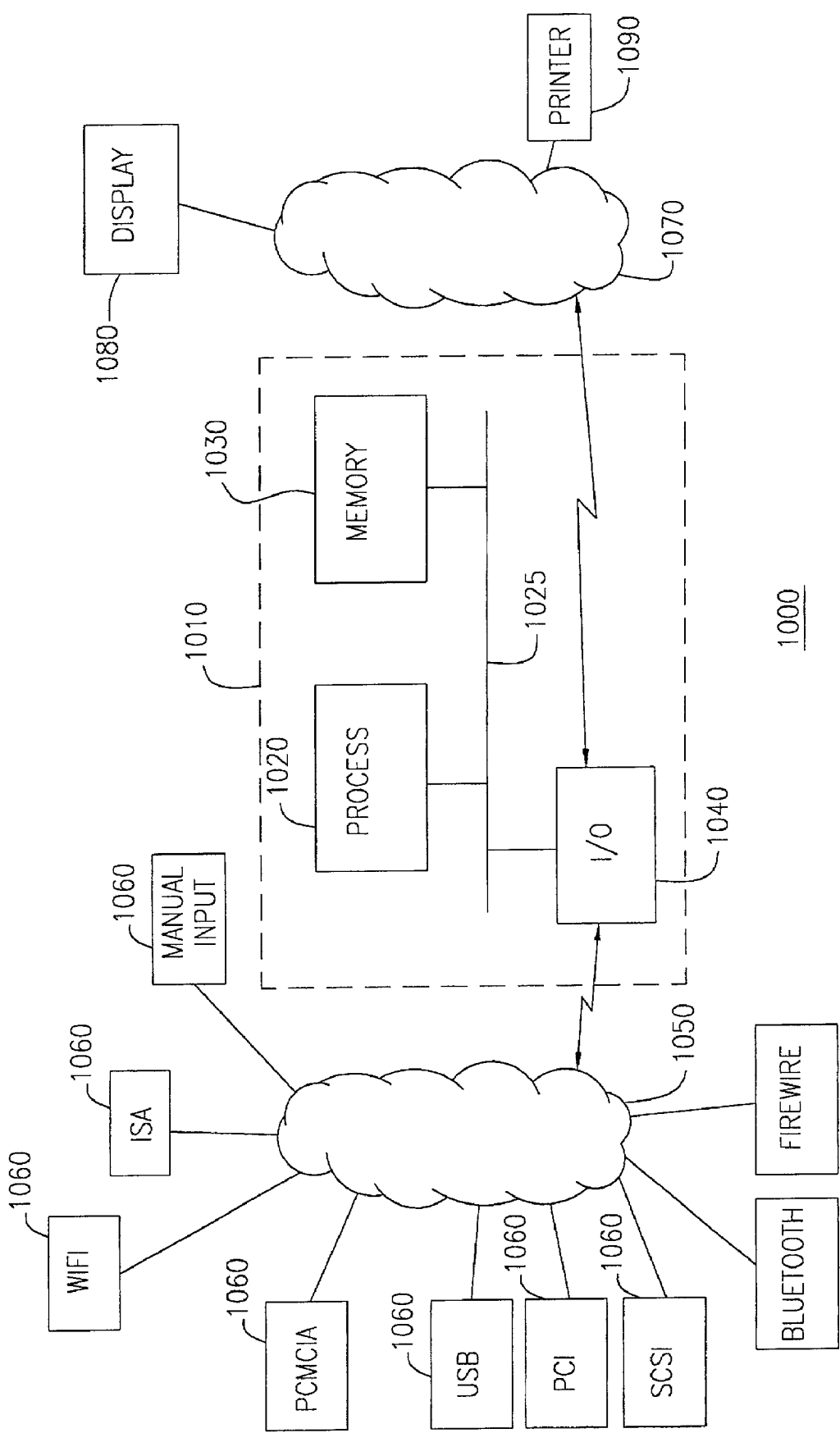
FIG. 10 illustrates a system for practicing the principles of the present invention.

FIG. 10 illustrates an exemplary system 1000 for practicing the principles of the invention. In this exemplary system embodiment, input data, such as key data, may be received over network 1050 and is processed in accordance with one or more software programs executed by processing system 1010. The results of processing system 1010 may then be transmitted over network 1070 for viewing on display 1080 and/or reporting at 1090.

More specifically, one or more input/output devices 1040 may receive key data from one or more of the illustrated network compatible devices 1060, for example, Flash memory chips, ROM chips, powered RAM chips, disk drive, floppy disk, CD ROM, over a corresponding network 1050, e.g., ISA, PCI, PCMCIA, USB bus, WIFO. In another aspect, key information may be obtained over the INTERNET.

The received key data may be applied to processing system 1010. Processing system 1010 comprises processor 1020, which is in communication with input/output device 1040 and memory 1030. Input/output devices 1040, processor 1020 and memory 1030 may communicate over a communication medium 1025. The communication medium 1025 may represent a local communication bus, such as an ISA, PCI, PCMCIA, USB bus, a wired or wireless communication network, one or more internal connections of a circuit, circuit card or other device, as well as portions and combinations of these and other communication media. Processor 1020 may be representative of a handheld calculator, special purpose or general purpose processing system, desktop computer, laptop computer, palm computer, or personal digital assistant (PDA) device etc., as well as portions or combinations of these and other devices that can perform the operations illustrated in the preceding figures. Processor 1020 may include code, which when executed, performs the illustrated operations. The code may be further be contained in memory 1030 or read/downloaded from a memory medium such as an external memory chip, a CD-ROM or floppy disk (which are not shown), which is accessible by processor 1020, when needed. The operations illustrated in the flow charts may be performed sequentially or in parallel using different processors to determine specific values. Further, the key data received by input/output device 1040 may be immediately accessible by processor 1020 or may be stored in memory 730. As will be appreciated, input/output device 1040 may also allow for manual or interactive input, such as a keyboard or keypad entry or may read data from magnetic or optical medium.

In other embodiments, hardware circuitry may be used in place of, or in combination with, software instructions to implement the invention. For example, the elements illustrated herein may also be implemented as discrete hardware elements or may be integrated into a single unit.

System 1000 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1050 and 1070 may be an internal network, e.g., ISA, microchannel, PCI, PCMCIA, USB, etc., or one or more internal connections of a circuit, circuit card or other device, as well as portions and combinations of these and other communication media or an external network, e.g., the Internet and Intranet.

In a preferred embodiment, processor 1020 is a conventional laptop computer containing PCMCIA port suitable to receive a PCMCIA memory card or PCMCIA adaptor and memory card that is accessible by the processor contained with the laptop computer. Key information may be stored on the memory card to prevent unauthorized decryption of encrypted data. Although a preferred embodiment is disclosed, it will be appreciated, the processor 1020 may similarly be a desktop computer having a floppy disk or C/D Rom port, which may allow the removable connection of medium suitable to contains key information. In another embodiment, processor 1020 may be a Personal Digital Assistant (PDA) having a slot that allows for the removable connection of a medium, e.g., SONY MEMORYSTICK, which contains key information.

It would be appreciated that encryption methods are well known in the art and in a preferred embodiment, a public key/private key encryption method, similar to that described in U.S. Pat. No. 4,200,770, entitled "Cryptographic Apparatus and Method, issued Apr. 29, 1980, to Hillman, et al., is utilized. However, it should be understood that methods for disguising or obscuring the actual e-mail address are also contemplated to be within the scope of the invention. For example, e-mail addresses may be obscured by translating the e-mail address using known arithmetic methods. In one aspect, key information may be merely added to, subtracted from, multiplied with, or divided into, the e-mail address to offset the e-mail address value. Similarly, proxy values may be used to obscure the e-mail addresses. For example, a numerical value may be used to represent each service provider. In this case, an e-mail address in the form of XXX.ISP.COM may be saved in the form XXX@Y.Com, where Y is a representative of numerical value that designates a particular ISP. Similarly, e-mail addresses may be scrambled using a substitution method, where letters or numbers replace corresponding numbers or letters. Hence, although the word encryption is used herein, it would be understood that the use of the word is not limited to one form of encryption technology but rather to known methods of obscuring or scrambling the true address value in order to prevent ready use of the address information.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention.

We claim:

1. A method for preventing dissemination of computer worms comprising the steps of:
   scrambling data indicative of e-mail addresses using a known scrambling technique, wherein the scrambling key is obtained from an external source; and
   storing said scrambled data in lieu of said e-mail addresses in a data base.

2. The method as recited in claim 1 wherein said scrambling technique is selected from the group consisting of: public/private key, translation, proxy, substitution.

3. The method as recited in claim 1 further comprising the steps of:
descrambling selected ones of said scrambling data using a known scrambling technique, wherein said scrambling key is obtained from an external source; and
addressing at least one e-mail message using said descrambled selected data.

4. The method as recited in claim 3 further comprising the steps of:
scrambling said decrypted data using a known scrambling technique, wherein said scrambling key is obtained from an external source; and storing said scrambled data in lieu of said e-mail addresses.

5. The method as recited in claim 1, wherein said data base is selected from the group consisting of: a local data base, a local address file, a local address book, a remotely located data base, a remotely located address book, a remotely located address file.

6. The method of claim 1, wherein said external source comprises an input device.

7. The method of claim 6, wherein said input device comprises a keyboard.

8. The method of claim 7, wherein said input device comprises a keypad.

9. The method of claim 1, further comprising accessing said data base.

10. The method of claim 9, further comprising opening at least one e-mail application.

11. The method of claim 10, further comprising downloading e-mail messages.

12. The method of claim 11, further comprising opening at least one of said e-mail messages.

13. The method of claim 1, further comprising connecting to at least one Internet service provider.

14. The method of claim 1, wherein said database comprises a first table comprising user indicative information distinct from e-mail addresses and a second table comprising e-mail addresses.

15. The method of claim 14, wherein each entry in said first table corresponds to an entry in said second table.

16. The method of claim 1, wherein said database comprises data packets, and each of said data packets has a given location corresponding to an e-mail address.

17. The method of claim 1, wherein said external source comprises a network.

18. The method of claim 1, wherein said external source comprises a memory device.

19. The method of claim 1, wherein said external source comprises a magnetic data medium.

20. The method of claim 1, wherein said external source comprises an optical data medium.

21. The method of claim 1, wherein said known technique comprises asymmetric cryptography.

22. The method of claim 1, wherein said scrambling comprises:
determining whether a key value is available; and,
requesting said key value be input when said key value is unavailable.

23. A method for preventing dissemination of computer worms, comprising the steps of:
accessing an e-mail server containing at least one e-mail message;
verifying data indicative of e-mail addresses stored in a data base are encrypted; and
encrypting said e-mail addresses determined not encrypted using a key value obtained from an external source.

24. The method as recited in claim 23 wherein said external source is a memory medium.

25. The method as recited in claim 23 wherein said external source is an interactive medium.

26. The method of claim 23, further comprising opening at least one e-mail application.

27. The method of claim 26, further comprising downloading said at least one e-mail message.

28. The method of claim 27, further comprising opening said at least one e-mail message.

29. The method of claim 23, further comprising connecting to at least one Internet service provider.

30. The method of claim 23, wherein said database comprises a first table comprising user indicative information distinct from e-mail addresses and a second table comprising e-mail addresses.

31. The method of claim 30, wherein each entry in said first table corresponds to an entry in said second table.

32. The method of claim 23, wherein said database comprises data packets, and each of said data packets has a given location corresponding to an e-mail address.

33. The method of claim 23, wherein said external source comprises an input device.

34. The method of claim 33, wherein said input device comprises a keyboard.

35. The method of claim 33, wherein said input device comprises a keypad.

36. The method of claim 23, wherein said external source comprises a network.

37. The method of claim 23, wherein said external source comprises a magnetic data medium.

38. The method of claim 23, wherein said external source comprises an optical data medium.

* * * * *